United States Patent [19]

Urai et al.

[11] 4,107,829
[45] Aug. 22, 1978

[54] METHOD OF MANUFACTURING SEAT CUSHIONS

[75] Inventors: Muneharu Urai; Shuichi Goto; Yutaka Fukui, all of Tokyo, Japan

[73] Assignee: Tachikawa Spring Co., Ltd., Tokyo, Japan

[21] Appl. No.: 780,522

[22] Filed: Mar. 23, 1977

[30] Foreign Application Priority Data

Apr. 5, 1976 [JP] Japan .................................. 51-37284

[51] Int. Cl.² ...................... B68G 7/052; B68G 7/06; B68G 7/12; B68G 15/00
[52] U.S. Cl. ...................................... 29/91.1; 29/91.2; 156/196; 156/285
[58] Field of Search ............. 29/91.1, 91.5, 91.7, 29/91.8; 264/46.8, 92; 156/196, 285

[56] References Cited

U.S. PATENT DOCUMENTS

| | | | |
|---|---|---|---|
| 2,697,057 | 12/1954 | Senger et al. | 156/196 |
| 2,796,634 | 6/1957 | Chellis | 156/196 X |
| 2,814,077 | 11/1957 | Moncrieff | 156/196 X |
| 2,917,783 | 12/1959 | Olson et al. | 264/92 X |
| 2,955,972 | 10/1960 | Wintermute et al. | 156/196 X |
| 3,023,430 | 3/1962 | Seymour | 29/91.1 |
| 3,325,329 | 6/1967 | Bolesky | 156/285 X |
| 3,513,050 | 5/1970 | Samuels et al. | 156/196 |
| 3,948,708 | 4/1976 | Doerer | 156/196 |
| 3,962,392 | 6/1976 | Conner, Jr. | 264/92 X |

*Primary Examiner*—Horace M. Culver
*Attorney, Agent, or Firm*—Oldham, Oldham, Hudak & Weber Co.

[57] ABSTRACT

In a method of manufacturing a permeable seat cushion, a permeable fabric material is pressed between a pair of dies while being heated and wetted with steam to render the fabric temporarily unpermeable to provide a seat covering of bag-like structure. A first precut filler pad is bonded to the seat covering, and a second precut filler pad is then bonded to the first filler pad. A frame is mounted together with springs and other necessary elements on the thus obtained assembly, and the seat covering is anchored at its pheripheral edges to the frame to complete the seat cushion.

3 Claims, 5 Drawing Figures

METHOD OF MANUFACTURING SEAT CUSHIONS

This invention relates to a method of manufacturing a seat cushion of the kind comprising a surface covering of woven or non-woven fabric material, a foamed synthetic resin material such as foamed polyurethane packed thereinside, and a frame mounted together with springs on the lower part thereof.

Seat cushions of this kind are widely used for seats in automobiles and various types of furniture. However, prior art seat cushions of this kind have required very troublesome manufacturing steps. One of the typical prior art processes used for the manufacture of the seat cushion of this kind has comprised the steps of cutting a piece of fabric material having a shape conforming to the desired configuration of the body portion of the seat cushion from at web of fabric material with or without a vinyl coating, sewing together these pieces of fabric material to form a seat covering of bag-like structure, inserting a filler pad of foamed synthetic resin material such as foamed urethane in the seat covering, and mounting the resultant assembly on a frame provided with springs.

However, such a prior art manufacturing process has required an extended time and a lot of labor. In addition, the prior art process has been defective in that twists and creases impairing the beautiful appearance of the product occur frequently, and the remedy thereof requires also an extended time and much labor.

The inventors has already proposed a process for the manufacture of such a seat cushion, which saves the labor and shortens the time required for the manufacture, and which can produce seat cushions of exactly the same shape. The process proposed by the inventors comprises the steps of joining pieces of vinyl-coated fabric material to one another through welt-providing intermediate elements to form a seat covering of bag-like structure, placing the seat covering of bag-like structure of vinyl-coated fabric material on a lower die having a forming cavity shaped to conform to the configuration of the seat cushion and also having an embossing pattern engraved on the bottom of the cavity, supplying high-temperature fluid under high pressure from the upper side of the lower die, and at the same time, applying vacuum suction from the underside of the lower die for simultaneously carrying out the shaping of the external configuration of the seat covering of bag-like structure and the embossing on the seat covering, molding a layer of foamed synthetic resin material on the seat covering while maintaining the application of vacuum suction from the underside of the lower die, placing a frame together with springs on the layer of foamed synthetic resin material molded on the seat covering of bag-like structure, fixing the peripheral edges of the seat covering to the frame, and then stopping the application of vacuum suction from the underside of the lower die.

According to such a process, a seat cushion can be easily obtained by applying vacuum suction from the underside of the lower die when a vinyl-resin-coated fabric material, which is impermeable to air, is used for providing the seat covering. However, when a non-vinyl-resin-coated fabric material or the like, which is permeable to air, is used to provide the seat covering, another process must be additionally employed due to the fact that such fabric material is more permeable to air, than that having the vinyl coating.

Vacuum molding of a foamed synthetic resin material such as foamed polyurethane on a woven or non-woven fabric is impossible due to the fact that such a fabric is permeable to air in itself. Further, during the direct molding of foamed polyurethane on such a fabric, the polyurethane solution penetrates into the texture to harden the fabric to such an extent that the product is no more suitable for use as a seat covering.

Therefore, it is common practice to provide a coating of vinyl resin or like material on a woven or non-woven fabric or to impregnate the fabric with vinyl resin or like material to make it impermeable to air, so that the vacuum molding of a foamed synthetic resin material such as foamed polyurethane on the fabric can be successfully done. According to this practice, however, the air permeability peculiar to a fabric is completely lost, resulting in various defects including sweating and confinement of moisture within the seat covering, especially in the summer season. Further, a back coating of vinyl resin or like material deprives the fabric of its peculiar softness resulting in it being uncomfortable to sit upon. Furthermore, such back coating may partly protrude to the front side of the fabric during processing thereby impairing the beautiful appearance of the seat cushion. Moreover, this back coating may be stripped off the fabric during processing.

In the prior art process of vacuum molding a foamed synthetic resin material such as foamed polyurethane on a vinyl-resin-coated fabric material which provides the seat covering, a fault during the formation of the seat covering or during the molding of the foamed polyurethane gives rise to necessarily a counter-fault in the other. For example, a large void produced within the molded layer of foamed polyurethane or similar void produced at the interface between the seat covering and the molded layer of foamed polyurethane is very difficult to remedy, and this difficulty has been the greatest problem encountered with the prior art process of vacuum molding. Thus, according to the prior art process, there has been a limitation on seat covering materials suitable for the manufacture of seat cushions, that is, useful seat covering materials have been quite limited.

With a view to obviating these prior art defects, it is a primary object of the present invention to provide an improved process for the manufacture of a seat cushion, in which a coating-free fabric material can be used to provide the seat covering without degrading the quality of the seat cushion and without giving rise to an unbalanced external configuration, so that the seat cushion can be manufactured at a low cost.

According to the process of the present invention, a seat covering providing material such as a woven or non-woven fabric material is placed on a lower die disposed opposite to an upper die of shape symmetrical to that of the lower die, and high-temperature fluid such as steam is supplied through the upper die and/or the lower die to the upper surface and/or the lower surface of the fabric material to heat and wet the same.

The upper die is then lowered toward the lower die to press the seat covering providing material between them. In this case, the upper and lower dies are preferably kept in the heated state, so that the seat covering providing material is left still in the pressed position while maintaining the required shape on the lower die after the upper die is then urged upward away from the lower die. In principle, this processing is similar to steam ironing on cloth. Stabilizing treatment may be applied to the back face of the fabric material to provide required stability against pressing under heat, or the fabric material itself may be deformable upon application of heat.

When the texture of the fabric material is especially fine, the texture may be filled or plugged with moisture. To avoid such a phenomenon, vacuum suction may be applied through a separately provided passage in the lower die so as to make up the effect of pressing of the seat covering providing material. Alternatively, the fluid supplied through the upper die may have a pressure high enough to ensure pressing of the seat covering providing material between the upper and lower dies.

Then, while keeping the thus shaped seat covering of fabric material in position on the lower die, or after transferring the shaped fabric material onto a separate mold of substantially the same shape, a first filler pad of conventional foamed material such as foamed polyurethane or foamed vinyl resin is bonded to the seat covering of fabric material, and then a second filler pad of similar material having a density and hardness greater than those of the first filler pad is bonded to the first filler pad. The seat cushion thus obtained provides satisfactory comfortableness to sit equivalent to that of conventional ones of the type fabricated by sewing with a sewing machine.

The first filler pad may not be used, and a foamed synthetic resin material may be directly molded on the seat covering depending on the kind of the fabric material. The seat covering may be partly or wholly bonded to the molded article to provide the seat cushion.

The above and other objects, features and advantages of the present invention will become more apparent from the following detailed description of a preferred embodiment thereof taken in conjunction with the accompanying drawing, in which.

Figure 1:
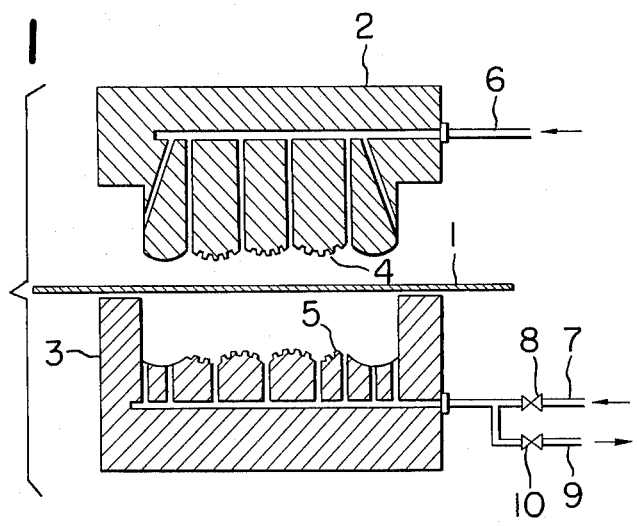
FIG. 1 is a schematic vertical sectional view of an apparatus used for the practice of the process according to the present invention.

Before describing the process according to the present invention in detail, dies used therefor will be described briefly with reference to FIG. 1. Referring to FIG. 1, an upper die 2 and a lower die 3 of approximately complementary shape are used to press a woven or non-woven fabric material 1 such as woven cloth, knitted fabric or non-woven cloth therebetween to provide a seat covering of bag-like structure. The upper die 2 is formed with a seat cushion surface pattern, an embossing pattern 4 and patterns (not shown) similar to a stitch pattern, a welt pattern and any other patterns appearing on products fabricated by sewing with a sewing machine. The lower die 3 is formed with patterns complementary to those of the upper die 2. The upper and lower dies 2 and 3 are connected to steam supply conduits 6 and 7 respectively. A plurality of steam passages extend through the dies 2 and 3 to communicate with the associated conduits 6 and 7, so that steam supplied therethrough can heat and wet the fabric material 1 pressed between the dies 2 and 3. A vacuum suction conduit 9 is connected to the steam supply conduit 7, and valves 8 and 10 are disposed on the respective conduits 7 and 9 at portions upstream of the connection point, so that steam and vacuum can be selectively supplied. The steam supply conduits 6, 7 and vacuum suction conduit 9 are connected to a steam generator and a vacuum pump (not shown) respectively.

The seat covering is produced by the steps of placing the fabric material 1 on the lower die 3 while moving the upper die 2 to an unobstructing position, supplying high-temperature steam through the upper steam supply conduit 6 and/or the lower steam supply conduit 7 to heat and wet the fabric material 1, and then urging the upper die 2 toward the lower die 3 to press the fabric material 1 between the upper and lower dies 2 and 3 thereby forming the fabric material 1 into the required shape. In this case, the lower die 3 may be urged upward instead of urging the upper die 2 downward. Further, after displacing the upper die 2 from the upper position and heating the fabric material 1 on the lower die 3 with high-temperature steam, the upper die 2 may be urged downward toward the lower die 3, or after sufficiently heating the fabric material 1 with high-temperature steam outside the upper and lower dies 2 and 3, the fabric material 1 may be placed in the pressed position between the upper and lower dies 2 and 3. Furthermore, after the fabric material 1 is placed on the lower die 3, high-temerature fluid except steam may be supplied by way of the conduits 6 and 7 to provide similarly satisfactory results.

After the fabric material 1 is heated with steam in the manner above described, the texture may be filled or plugged with moisture to render the fabric material 1 impermeable to air when the texture is especially very fine. In such a case, the valve 8 may be closed to shut off the steam supply, and the valve 10 may be opened to apply vacuum suction thereby making up the pressing effect, or the pressure of steam supplied to the upper die 2 may be increased to force the fabric material 1 against the lower die 2. When the fabric material 1 has high permeability to air, a rubber sheet may be placed on the upper surface of the fabric material 1 to make the vacuum suction more effective.

Depending on the quality of the fabric material 1 and also on the configuration of the seat suction, heating steam may not be used, and another method of heating may be resorted to during pressing the fabric material 1 between the upper and lower dies 2 and 3. In the process of the present invention, the body and side portions of the seat covering may be in the form of a joint-less bag-like structure, or the body portion may be jointed to the side portions by mechanical sewing or high-frequency welding, as is customary in the art.

The process for manufacturing a seat cushion using the thus shaped fabric material 1 of bag-like structure will now be described in greater detail.

After providing the external shape of the seat covering 1 and applying the embossing treatment thereto, the seat covering 1 of fabric material is left intact on the lower die 3 while moving the upper die 2 to an unobstructing position, or the seat covering 1 of fabric material is transferred onto a separate mold of the same shape. A first filler pad 12 of conventional foamed material such as foamed polyurethane or foamed vinyl resin is bonded to the seat covering 1 of fabric material, and then a second filler pad 13 of the same or similar material having a density and hardness greater than those of the first filler pad 12 is bonded to the first filler pad 12.

The first filler pad 12 may not be used, and the second filler pad 13 may be molded to have a higher density in one portion that that in the remaining portion, and such filler pad 13 may be bonded to the seat covering 1 of fabric material at the former portion thereof.

Figure 2A:
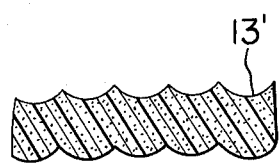
FIG. 2a is a schematic sectional view of a profile-cut slab of foamed synthetic resin material which may be for the manufacture of the seat cushion according to the present invention.
Figure 3:
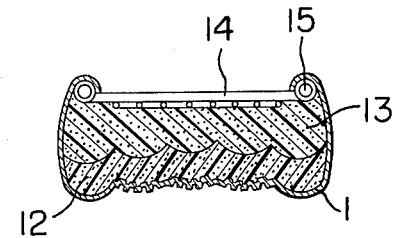
FIG. 3 is a schematic sectional view of the seat cushion manufactured by the process of the present invention.
Figure 2B:
FIG. 2b is a schematic sectional view of another form of the filler pad which may be used for the manufacture of the seat cushion according to the present invention.

Since the second filler pad 13 is not covered with a surface layer formed from a mold releasing agent or any other such agent. Therefore, the desired permeability to air is ensured, and the second filler pad 13 would not be stripped. Very good permeability to air can be obtained when the second filler pad 13 is prepared in the form of a profile-cut slab 13' as shown in FIG. 2a. Such slab 13' may be used in, for example, a rear seat cushion. The first filler pad 12 may have an original shape as shown by 12' in FIG. 2b. The seat cushion having the first filler pad 12 incorporated therein can provide the comfortableness to sit similar to that of conventional ones fabricated by sewing with a sewing machine.

After bonding the second filler pad 13 to the first filler pad 12, the seat covering 1 containing the first and second filler pads 12 and 13 therein is removed from the lower die or mold, and necessary elements including springs 14 are suitably disposed thereon. After mounting a frame 15 on the assembly, the seat covering 1 is anchored at its peripheral edges to the frame 15 by means such as C-shaped clips.

Figure 4:
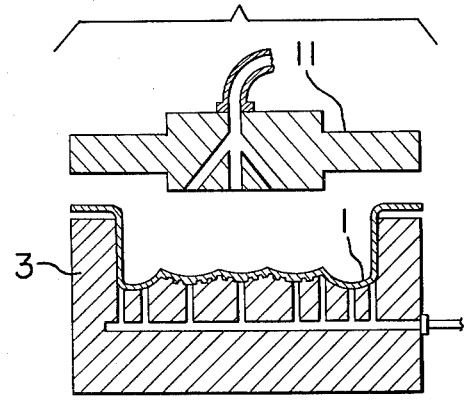
FIG. 4 is a schematic vertical sectional view of a foamed synthetic resin material injecting means which may be used in the process according to the present invention.

The first and second filler pads 12 and 13 may be molded together with the seat covering 1 when the fabric material has an especially fine texture, or it is not as permeable to liquid, or it has been subjected to anti-permeation surface treatment. In such a case, the upper die 2 is displaced from the position opposite to the lower die 3, and an injection molding unit 11 as shown in FIG. 4 is brought opposite to the seat covering 1 placed on the lower die 3 to mold the first filler pad 12 thereon by injection-molding a foamed synthetic resin material such as foamed polyurethane. Another injection molding unit may be used to injection-mold the second filler pad 13, or this filler pad 13 may be molded in the next step. After the second filler pad 13 cures, the seat covering 1 containing the first and second filler pads 12 and 13 therein is removed from the lower die 3 or mold, and the springs 14 and frame 15 are mounted thereon. The springs 14 and frame 15 may be placed on the lower die 3 prior to the molding of the second filler pad 13, and after molding the second filler pad 13, the seat covering 1 containing the first and second filler pads 12 and 13 therein may be removed from the lower die and may then be anchored at its peripheral edges to the frame 15 by the fixtures in the manner above described.

The process according to the present invention can be utilized for making both the seating portion and the back supporting portion of the seat cushion by merely changing the shape of the dies.

The seat cushion having the seat covering manufactured by the process according to the present invention is satisfactorily permeable to air unlike conventional ones manufactured by the process of vacuum molding using a conventional seat covering of vinyl-coated fabric material or by the process of molding foamed polyurethane on a seat covering impregnated with the polyurethane solution. Thus, the seat cushion maintains the soft touch peculiar to a fabric. Further, the incorporation of the first filler pad of foamed synthetic resin material such as foamed polyurethane in the seat cushion improves the comfortableness to sit. Furthermore, the seat cushion covered with the unique seat covering gives a beautiful appearance and is free from such a prior art defect that the back coating tends to be stripped off when encountered with repeated seating engagement by passengers.

The seat cushion obtained by the process according to the present invention possesses the same external appearance and merits as those of a conventional one fabricated by sewing with a sewing machine, and yet, it is quite inexpensive due to the fact that any especial technique is not required. Further, the seat cushion obtained according to the present invention has permeability to air better than that of conventional ones since no surface layer resulting from attachment of a mold releasing or other agent is deposited on the second filler pad. Employment of a profile-cut slab as shown in FIG. 2a gives also better permeability to air. The seat cushion according to the present invention provides such another advantage that an internal void as described hereinbefore is not produced at the interface between the seat covering and the adjoining filler pad.

The prior art seat cushion using a vinyl-resin-coated fabric material has been defective in that the coating is not extensible, and the fabric material is hardened by the polyurethane solution penetrating into the texture.

In contradistinction, the seat cushion obtained by the process according to the present invention obviates the above defect due to the fact it uses a non-vinyl-resin-coated fabric material.

We claim:

1. A method of manufacturing a seat cushion comprising the steps of placing a seat covering providing fabric material on a lower die disposed opposite to an upper die of shape complementary to that of said lower die, supplying steam by way of at least one conduit connected with said upper and lower dies thereby heating and wetting said fabric material, urging said upper and lower dies relative to each other to press said fabric material therebetween thereby forming a seat covering of bag-like structure, inserting a first filler pad of cushion providing material into the internal space of said seat covering of bag-like structure and bonding said first filler pad to said seat covering, bonding a second filler pad of cushion providing material having a density greater than that of said first filler pad to said first filler pad, mounting a frame together with elements including springs on the assembly thus obtained, anchoring said seat covering to said frame at its peripheral edges, and including applying vacuum suction to said lower die so as to assist in the formation of said seat covering of bag-like structure by the steam supply.

2. A method as claimed in claim 1, wherein said seat covering bears an embossed pattern and patterns similar to a stitch pattern, a welt pattern and any other patterns appearing on a product fabricated by sewing with a sewing machine.

3. A method of manufacturing a seat cushion comprising the steps of placing a permeable fabric seat covering material on a lower die disposed opposite to an upper die of shape complementary to that of said lower die, supplying steam through said dies thereby heating and wetting said fabric material and rendering the same impermeable, urging said upper and lower dies towards each other while maintaining the supply of steam to said fabric material to press said fabric material therebetween thereby forming a seat covering of bag-like structure and simultaneously applying vacuum suction to said lower die to assist in the formation of said seat covering by the steam supply; inserting a first precut filler pad of cushion providing material into the internal space of said seat covering of bag-like structure and bonding said first filler pad to said seat covering, bonding a second precut filler pad of cushion providing material having a density greater than that of said first filler pad to said first filler pad, and anchoring said seat covering to a frame means.

* * * * *